Sept. 20, 1955 C. F. MATTKE 2,718,549
CONTINUOUS FILM MOTION PROJECTOR FOR TELEVISION
CAMERA AND FILM RECORDERS
Filed Oct. 29, 1949 5 Sheets-Sheet 1

INVENTOR
C. F. MATTKE
BY
Stanley B. Kent,
ATTORNEY

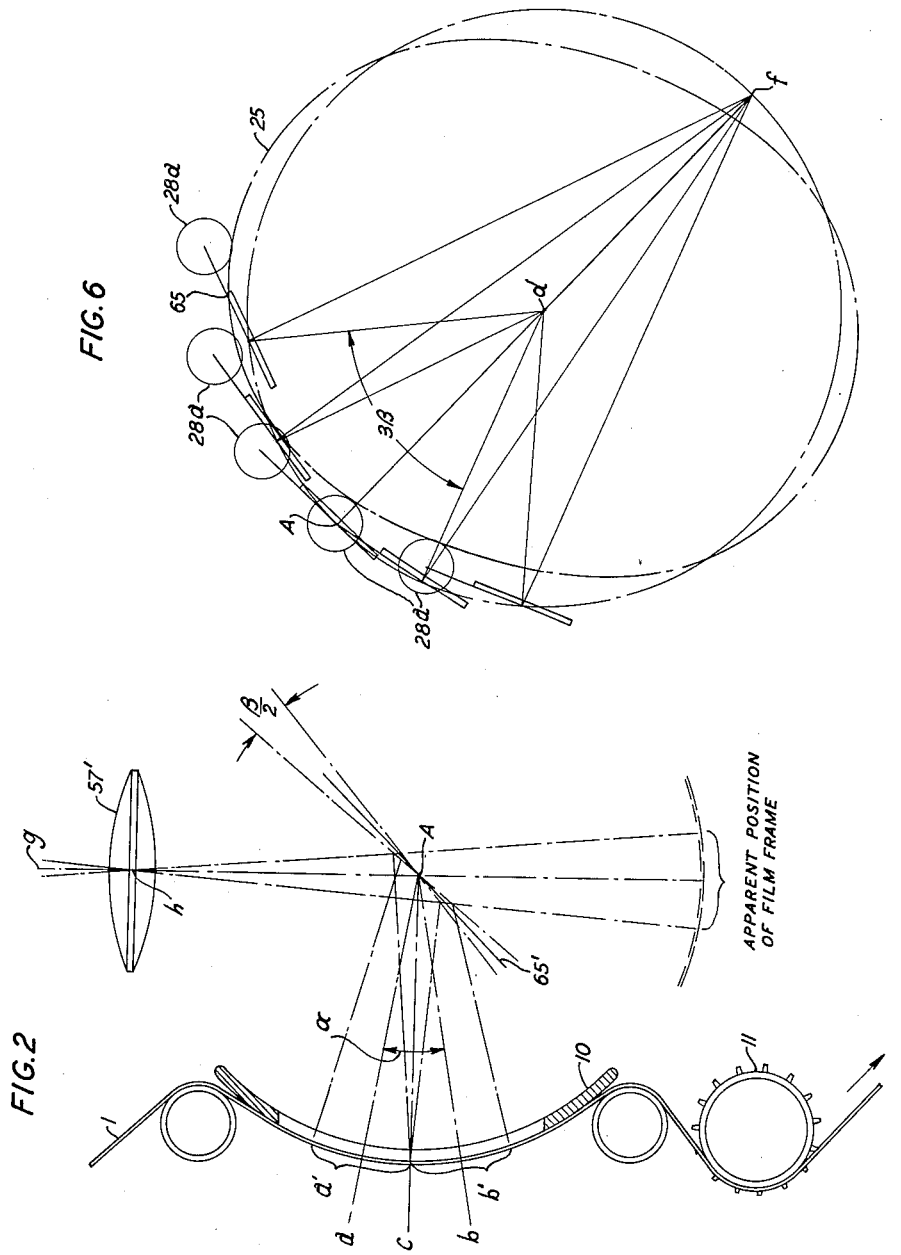

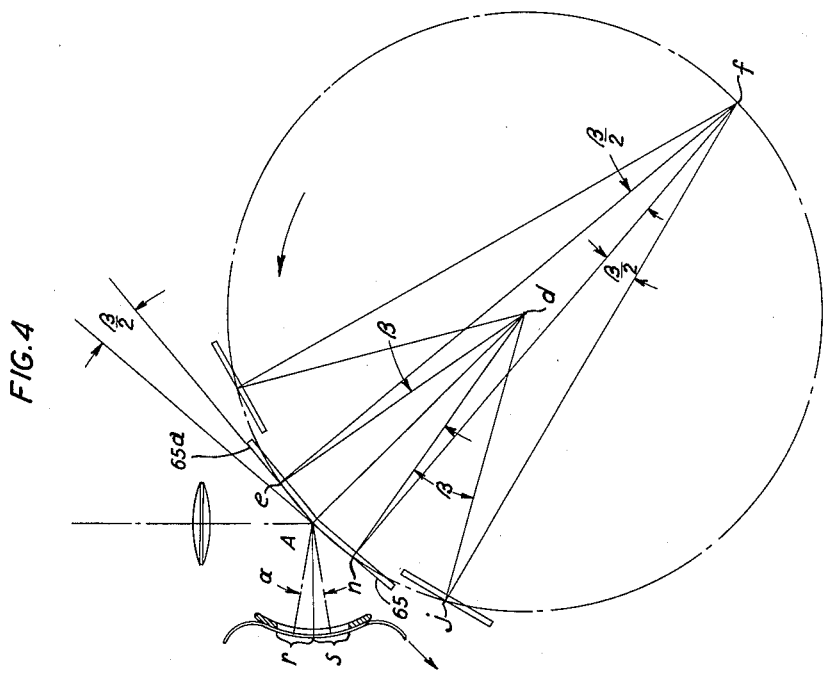
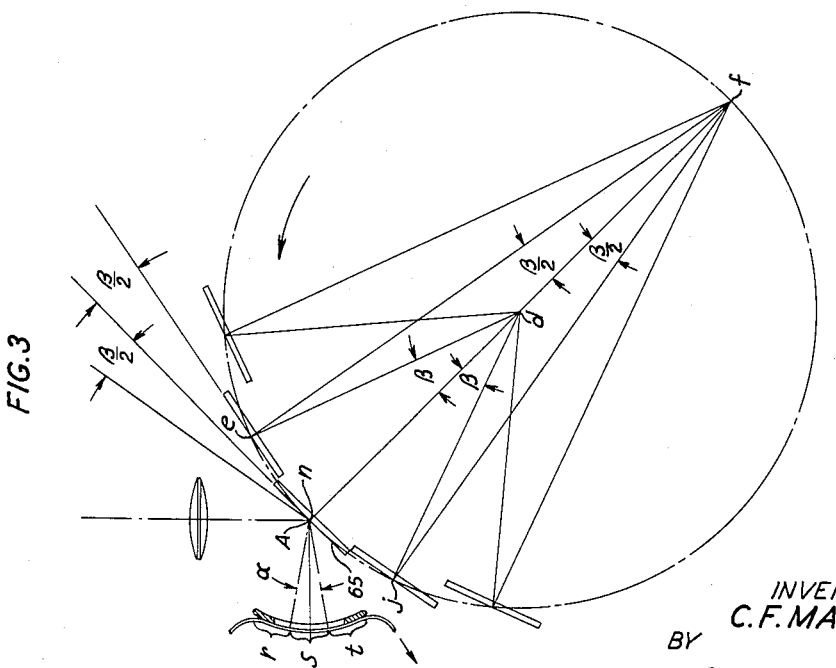

Sept. 20, 1955                    C. F. MATTKE                    2,718,549
        CONTINUOUS FILM MOTION PROJECTOR FOR TELEVISION
                    CAMERA AND FILM RECORDERS
Filed Oct. 29, 1949                                     5 Sheets-Sheet 4
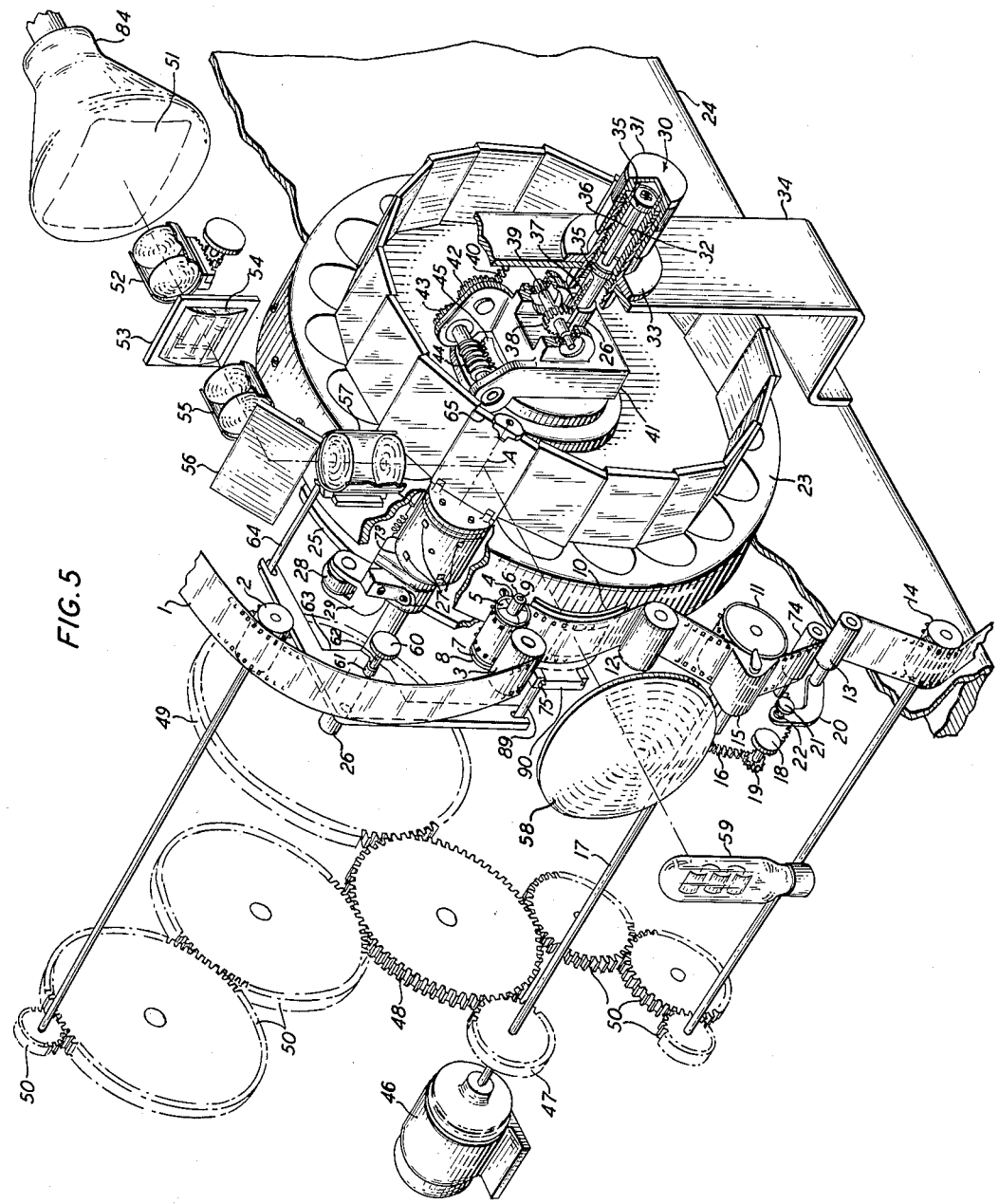
INVENTOR
C. F. MATTKE
BY
Stanley B. Kent.
ATTORNEY Sept. 20, 1955　　　　　　　C. F. MATTKE　　　　　2,718,549
CONTINUOUS FILM MOTION PROJECTOR FOR TELEVISION
CAMERA AND FILM RECORDERS
Filed Oct. 29, 1949　　　　　　　　　　　　　5 Sheets-Sheet 5
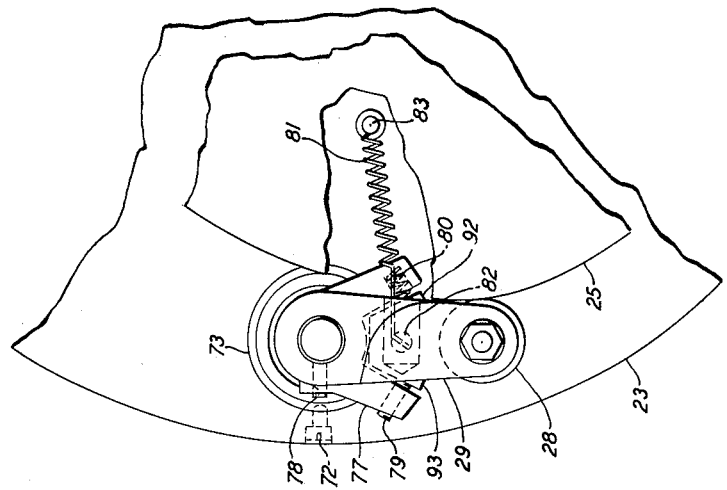
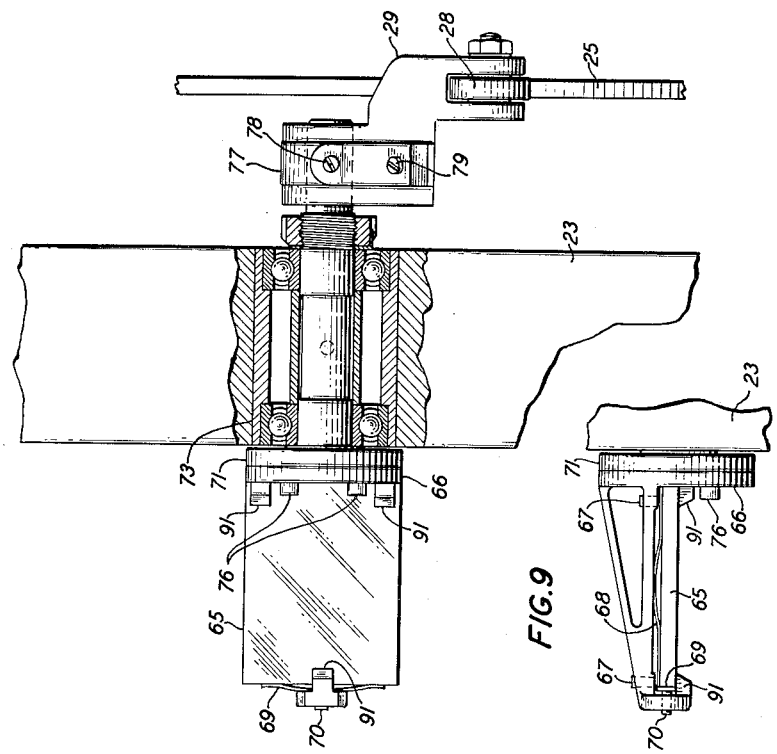
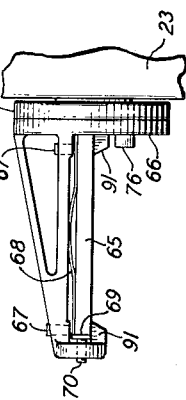
INVENTOR
C.F. MATTKE
BY
*Stanley B. Kent*
ATTORNEY

United States Patent Office 2,718,549
Patented Sept. 20, 1955

2,718,549

CONTINUOUS FILM MOTION PROJECTOR FOR TELEVISION CAMERAS AND FILM RECORDERS

Charles F. Mattke, Fanwood, N. J., assignor to Bell Telephone Laboratories, Incorporated, New York, N. Y., a corporation of New York Application October 29, 1949, Serial No. 124,403

3 Claims. (Cl. 178—7.2)

This invention relates to an optical projector for recording on and producing from moving film.

An object of the invention is to provide an improved optical projector whereby stationary and continuously moving optical patterns may be produced one from the other.

Another object is to improve the recording of television images on unexposed motion picture film.

In an example of practice the frames of a continuously moving motion picture film are projected as stationary images on a viewing screen. The illusion of motion is produced as images of successive frames are merged on the viewing screen. The projector comprises a uniformly rotating multiple mirror drum, the mirrors being so controlled by a single cam and individual cam followers that the plane of each mirror intersects the optical axis of the projection lens at a fixed point during its passage across the projection beam. The mirrors are oscillated about movable axes individual to the several mirrors which are parallel to the axis of the drum and equally spaced around a cylindrical surface coaxial with the drum so that stationary images of the moving frames are projected on the viewing screen. The oscillation of the mirrors is controlled by the individual cam followers which contact the surface of the single stationary cam. The projection light beam is reflected by the mirrors in succession. The cam is so shaped that when the axis of each mirror intersects the axis of the projection lens, that mirror is perpendicular to the drum radius passing through its axis and that mirror continues to intersect the same point of the axis of the projection lens while the mirror intercepts the projection beam. The film driving sprocket is adjustably coupled to the rotating mirror drum to provide the necessary relative motions of these members for framing purposes.

This projector is another example of practice may be used as a scanner of continuously moving motion picture film for television purposes. The viewing screen is replaced by the luminescent screen of a cathode-ray tube, the cathode beam of which is caused to scan the screen in any desired manner to form a scanning pattern or raster. By means of the projector of this invention, this pattern is projected on the frames of a continuously moving motion picture film, thereby scanning the frames of the film element by element. The transmitted light is directed to a photoelectric device wherein corresponding television image currents are produced.

This projector may also be used to project television images which are formed on a cathode-ray tube screen to continuously moving unexposed motion picture film to expose a succession of frames thereon. Other uses will occur to persons skilled in this art.

Another feature of this invention is a cam which is symmetrical with respect to the axis of the mirror drum so that the drum is dynamically balanced. While each mirror intercepts the projection beam its position and movement are rigidly determined by the optical requirements. During the rest of its travel its movement is controlled to effect the above-mentioned dynamic balancing. By reason of the symmetry of the cam and an even number of mirrors, there is always an inactive mirror diametrically opposite to either an active or an inactive mirror and like elemental portions of opposed mirror mechanisms are diametrically opposed and at the same radial distance from the drum axis. This results in a minimum of vibration during the rotation of the drum and the individual movement of the mirrors.

The invention will now be described in greater detail, having reference to the accompanying drawings.

Figs. 2, 3 and 4 are diagrams illustrative of the optical and mechanical principles of the projector of this invention;

Fig. 5 shows in perspective a television scanner according to this invention;

Fig. 6 illustrates geometrically the mirror controlling cam and a grinding wheel therefor; and Figs. 7, 8 and 9 show details of the device of Fig. 5.

Like reference characters are used to designate identical elements in the several figures of the drawing.

Figure 1:
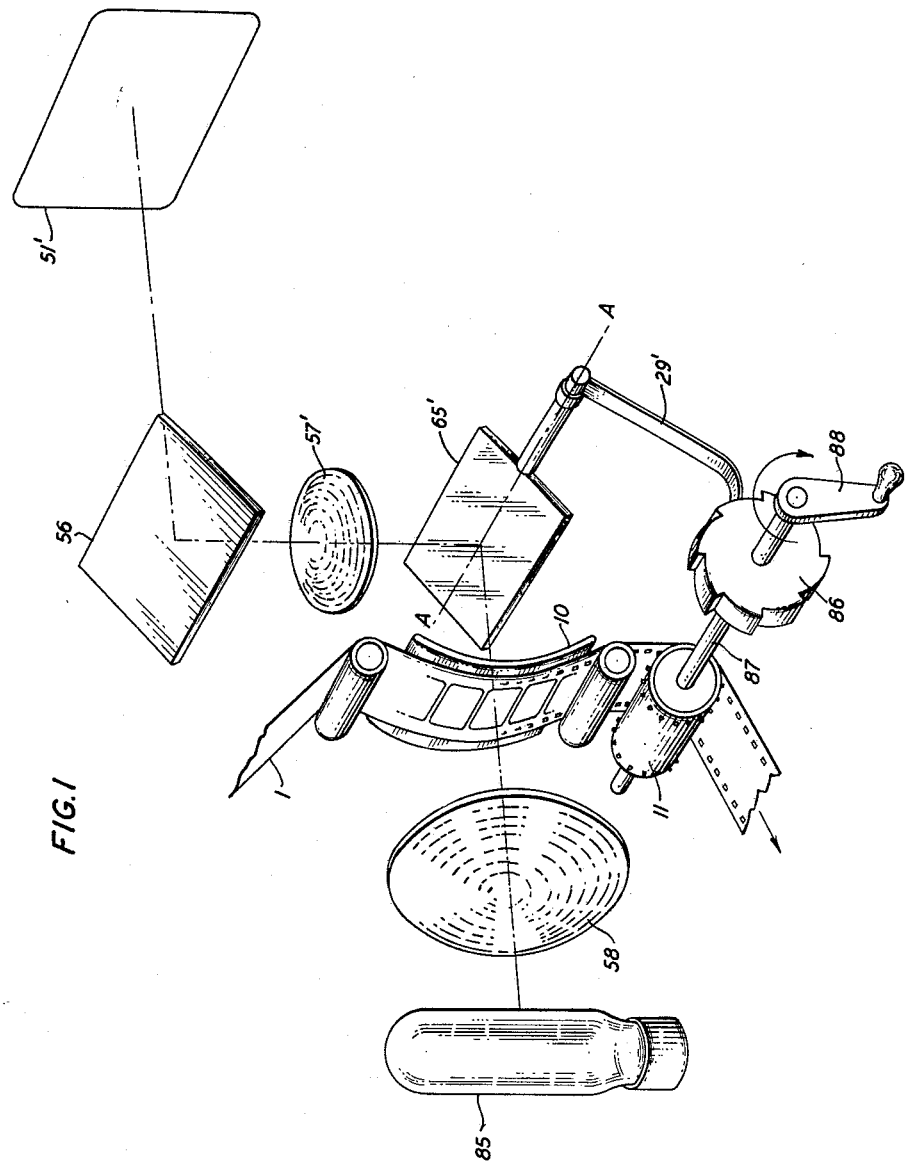
Fig. 1 shows a simplified manually driven projector illustrative of the principles of this invention.

In order to explain the operation of this projector a few of the fundamental principles and geometric relations will first be described.

The basic principle of operation of the projector is shown on Fig. 1. Film 1 is moved at a uniform rate by sprocket 11 down over curved gate 10. Light rays from lamp 85 passing through condensing lens 58 and film 1 are reflected by compensating mirror 65' into and through objective lens 57' and reflected from fixed mirror 56 onto screen 51'. As sprocket 11 is rotated to move film 1, mirror 65' is caused to rotate about axis "A" by the action of cam 86 on arm 29'. Axis "A" is the center of curvature of curved gate 10. The amount of rotation of mirror 65' is such that the image of the film frame on the screen produced by lens 57' remains stationary. The sprocket 11 and cam 86 are rigidly connected to shaft 87, which may be rotated manually by crank 88.

The geometric relation between film 1 and the mirror 65' is shown in Fig. 2. Consider the horizontal line CA passing through the center of the aperture in gate 10 and the center of curvature "A" of gate 10 as a fixed horizontal optical axis; also the radial lines aA and bA passing through the centers of two adjacent film frames a' and b' of film 1 and point "A" to form an angle α. Also consider line gA as a fixed optical axis passing through point A and the nodal point h of objective lens 57'. Finally consider the reflecting surface 65' of a mirror pivoted about point "A."

The requirement for optical compensation of the moving film is as follows:

When a ray of light aA moves through the angle α to bA, the direction of the reflected ray Ag must remain stationary.

This is accomplished by the rotation of mirror 65' about point "A" through an angle α/2 while the film moves through the angle α.

Optically speaking, during the motion of the film through the gate, frame a' appears stationary to lens 57', i. e., the apparent position of the film frame has not changed, as indicated in Fig. 2.

For continuity of film and mirror action, the action of mirror 65' is made repetitive by using a suitable number of axially mounted mirrors equally spaced in a circle to form a sort of drum, the axes of the mirrors lying in the plane of the mirror reflecting surfaces and all being parallel to the axis of rotation of the drum. As the drum rotates, the mirrors are then caused to rotate at the required angular rate about their axes, by means of a suitable cam action.

The continuity of the action of the mirrors is shown in Figs. 3 and 4, where Fig. 3 shows one mirror 65 at the middle of its compensation cycle and Fig. 4 shows two adjacent mirrors 65 and 65a at the extremities of their compensating cycle. The axes e, n and j of the corresponding three mirrors in Fig. 4 are located on the arc of a circle with center of rotation at point d, the axis of the drum. Line Af is a diameter of the circle and lines de, dn and dj are radii of the mirror axes e, n and j. If etry of the system makes the angles efn and jfn both equal the angles nde and ndj are both equal to β then the geometry of the system makes the angles efn and jfn both equal to β/2. Also lines drawn through e, n or j, perpendicular respectively to ef, nf and jf, will all pass through point "A."

These perpendiculars lie in the reflecting planes of the respective mirrors and it is seen therefore that, during the rotation of the drum about point d, the planes of the active mirrors 65 always pass through point "A," which is one of the requirements for compensation. Also each mirror 65 generates an angle of β/2 relative to the fixed diameter Af, which is the second requirement for compensation.

Referring to Fig. 2 it is seen that the angle α referring to the arc subtended by the film frame pitch is equal to the angle β referring to the corresponding rotation of the mirror drum.

As the drum rotates and the mirrors 65 obey the geometric principles just outlined, the reflected ray Ah remains stationary while the film moves from a to b through angle α. Fig. 3 shows the mirror in a position when film frame s is at the center of the aperture in the gate 10, while Fig. 4 shows the mirror positions when the frame s is at the limit of its travel in the gate.

Summarizing, the principles of the design are as follows:

1. The apparent position of the film frame remains unchanged.
2. No variable distortion of the image is introduced.
3. The frame image curvature remains constant.
4. The action of the compensating mirrors follows a well known simple geometric law.
5. The film image is available 100 per cent of the time.
6. No adjustment of the compensating mirrors or cam is necessary for projection lenses with different focal lengths.

The construction of a projector incorporating the above mentioned principles is shown in Fig. 5. The projector as shown in Fig. 5 is part of a television picture signal generator in which a cathode-ray tube is the scanning unit and a photocell is its light to electric signal transformer.

Referring now to Fig. 5; film 1 after being drawn from an upper supply reel, not shown, by a feed sprocket 2, forms a loop between sprocket 2 and an idler roller 3. Film 1, passing under idler roller 3 over a film tensioning sprocket 4, is drawn down over the curved aperture gate 10 by film drive sprocket 11. An idler roller 12, under which film 1 moves, insures contact between curved aperture gate 10 and film 1. This contact between film 1 and aperture gate 10 is maintained by the tension in that section of film 1 between film tension sprocket 4 on a shaft 9 and film drive sprocket 11. Tension in this section of film 1 results from the friction loading of film tensioning sprocket 4. Film tensioning sprocket 4 is frictionally loaded by the axial pressure of a cup spring 5 on a stationary disc 8 and a friction disc 7 fastened to sprocket 4. Adjustment of the amount of friction is obtained by a movable collar 6. Film 1, after passing over drive sprocket 11, passes under an idler roller 74 over an idler roller 13 and onto a lower feed sprocket 14.

For smooth motion of the film 1 the amount of film in contact with film drive sprocket 11 is varied by turning a knob 18 attached to a pinion 19. Pinion 19 engages a gear sector plate 16 coaxially located about a film drive sprocket shaft 17. On gear sector plate 16 are mounted a film pressure pad 15, film guide roller 74, film tension roller 13, a film tension roller arm 20, a stud 21 and a spring 22.

The component arrangement shown in Fig. 5 is for television picture signal generation from motion picture film. The scanning light source shown is a cathode-ray tube 84 on which a uniformly bright scanning raster 51 occurs.

Light from the cathode-ray tube raster 51 forms an image of raster 51 at a fixed aperture plate 53 after passing through a focusable image forming lens 52. Light rays, after passing aperture plate 53 and a field curving lens 54 and continuing through image forming lens 55, strike fixed mirror 56 from which they are reflected toward image forming lens 57. The light rays after passing through lens 57 continue toward the compensating mirrors 65 from which they are again reflected toward film 1 at the curved aperture gate 10. Light reaching film 1 in the aperture gate 10 has formed an image of the image at fixed aperture 53.

Through the compensating action of the mirrors 65 a raster image continues to fall on each film frame as the film 1 passes gate 10.

The light rays, after passing through the film 1 in the gate 10, are directed by condensing lens 58 into photosensitive device 59.

Image forming lens 55 and lens 57 are adjusted to infinity focus facing each other, i. e., lens 55 is located at the position where an image of aperture plate 53 occurs at infinity; likewise lens 57 is located at the position where light from lens 55 passing through it forms an image at the curved gate 10.

In order to maintain a fixed distance between the curved aperture gate 10 and the image forming lens 57 when aperture plate 10 is moved to accommodate film of different shrinkage conditions, a knob 60, when rotated, moves both gate 10 and lens 57 parallel to the optical axes at their respective positions.

A cam 61 attached to a cam shaft 62 to which knob 60 is also fastened is located in the central slot in a bell crank 63. Rotation of the cam 61 causes a shaft 64 attached to lens 57 and slidably located in the slot in one of the arms of the bell crank 63 to move parallel to the optical axis between the fixed mirror 56 and the pivot axis, "A," of the compensating mirrors 65. Likewise a shaft 89 attached to a slide plate 90 and slidably located in a slot in the other arm of bell crank 63 is caused to move parallel to the optical axis between condensing lens 58 and the pivot axis "A." Slide plate 90 to which aperture plate 10 is attached is located in a guide plate 75 attached to a main frame 24.

Pivot axis "A," about which the planes of the active compensating mirrors 65 rotate, also lies on the circle on which the centers of the individual mirror units are located.

The mirror units, one of which is shown more in detail in Fig. 7, are mounted in carefully machined cylindrical holes near the periphery of drum 23 and each is held in place by a clamp screw 72, Fig. 8, which tends to pull the shell 73 toward the outer wall of the hole. Contact between the outer wall and the shell 73 occurs at the contact pads 27 only. These pads are machined on shell 73 to assure correct positioning with ease when assembling.

The mirrors 65 are actuated during the rotation of drum 23 by the rollers 28 mounted on the individual follower arms 29 rolling on a cam surface 25.

The shape of the cam 25 is considered from two requirements: (a) the optical performance of the mirrors 65, and (b) the dynamical mechanical balance of the drum 23. For the optical performance an angular 3b segment of the cam necessary to produce the mirror compensation is all that is needed, as shown in Fig. 6. The remainder is used to return the cam follower roller to the beginning of the segment. Dynamically, however, in order to eliminate any unbalance in the assembled rotating system, duplicate cam segments must be located diametrically opposite each other. In this manner the radial distance of opposite mirror mounting castings and associated cam follower mechanisms will always be the same and thereby provide the necessary counterbalance. The final shape of the cam 25 is seen in Fig. 6 solid and dashed. A feature of the important cam curve is that it can be generated quite easily with a grinding fixture constructed for the purpose. Fig. 6 shows the generated cam surface 25, the full line, and the path taken by a grinding wheel 28a mounted on the grinding fixture when grinding the 3b segment.

A view partly in section of one of the mirror units, Fig. 7, shows a typical quill bearing assembly which will not be discussed further. The front surface mirror 65 is mounted in mirror holder 66, with the reflecting surface in contact with the machined surfaces of the contact pads 91 and is held in place by pressure screws 67 bearing against flat spring pressure plate 68. Flat spring 69 and screw 70 apply pressure to the end of mirror 65 to prevent lateral shifting. Mirror holder 66 is fastened to the flanged shaft 71 by screws 76.

Mounted on the shaft end of flanged shaft 71 is adjusting block 77 and follower arm 29. Block 77 is fastened to shaft 71 by set screw 78 and fits the machined slot in arm 29 such that it can move rotationally only about the axis of shaft 71. In block 77 are located adjusting screw 79 and spring 80. Spring 80 bears on one of the pads 92 on cam follower arm 29 and adjusting screw 79 bears on the other pad 93. Rotation of screw 79 allows the final angular adjustment between mirror 65 and cam follower arm 29.

Contact between the cam 25 and the cam follower roller 28 is assured by the action of spring 81. Spring 81 is attached to cam follower arm 29 by pin 82 and to drum 23 by pin 83.

Mirror drum 23, Fig. 5, is rotatably mounted on a fixed hollow shaft, not shown, which in turn is mounted on main frame 24. Also attached to the fixed hollow shaft is cam 25. The mirror drum 23 is caused to rotate by shaft 26 which passes through the fixed hollow shaft. Shaft 26 is coupled to the drum 23 through the film framing mechanism 30 at one end and gear 49 at the other.

Manual framing, i. e., aligning the film frame with mirror 65 in proper register when necessary, results when the angular position between shaft 26 and drum 23 is changed. Knob 31, attached to hollow screw thread and bearing support 32, when turned, moves axially in or out of the stationary flanged nut 33, flanged nut 33 being fixed to the main frame by bracket 34. The axial movement of bearing support 32 causes bearings 35 and shaft 36 on which rack 37 is mounted to move axially either while shaft 26 is rotating or at rest. This axial movement of shaft 36 and rack 37 causes pinion 38, in mesh with rack 37, and gear 40, pinion 38 and gear 40 being both attached to shaft 39, to rotate. The rotation of gear 40 causes gear 42, gear 43 and worm 44 to rotate also. Worm gear 45, solidly attached to drum 23 and located coaxially about shaft 26, rotates about shaft 26 whenever worm 44 rotates. Bearing block 41, on which are mounted gear 38, shaft 39, gears 40, 42 and 43 and worm 44, is solidly connected to shaft 26.

Gear 49 attached to shaft 26 meshes with idler gear 48 which in turn meshes with gear 47 attached to film drive sprocket shaft 17. This gear train constitutes the coupling between the film drive and the compensating mirror drum 23. Gears 50 furnish motion to the film feed sprockets only. Motor 46 is coupled to shaft 17 through a speed reducer to satisfy the motion picture film speed requirement.

Referring again to Fig. 5, a projector for producing motion picture film from television images on a cathode-ray screen is formed by using raw film for film 1 and forming a television image on screen 51 of cathode-ray tube 84. In this modification the condensing lens 58 and photosensitive device 59 are not used and the raw film 1 is protected from extraneous light, as by operating the mechanism in a dark room or by enclosing portions or all of the mechanism in a light-excluding container as necessary.

It is to be understood that the hereinbefore described arrangements are illustrative of the application of the principles of the invention. Other arrangements may be devised by those skilled in the art without departing from the spirit and scope of the invention.

What is claimed is:

1. An optical image producing device for continuously moving motion picture film comprising a support, a mirror drum rotatably mounted on said support and having an even number of generally cylindrical mirror bearing compartments parallel to, equally spaced from and uniformly spaced around the axis of said drum, a mirror bearing mounted in each bearing compartment having a substantially cylindrical outer surface and a substantially coaxial rotatable member, a plurality of accurately positioned contact pads on the inner surfaces of said compartments against which said mirror bearings are tightly held, a plane mirror mounted at one end of each rotatable member with the reflecting plane coincident with the axis of said rotatable member, a cam follower secured to the other end of each rotatable member including a cam roller having its axis lying in the reflecting plane of the corresponding plane mirror, a cam disc rigidly secured to said support substantially perpendicular to the axis of said mirror drum, resilient means holding each cam roller in contact with the edge of said cam disc which is shaped to oscillate each mirror about its rotatable member and about an axis fixed in space during some portion of the rotation of the drum, said fixed axis lying in the path of the axes of said rotatable members, a cylindrical film gate mounted in proximity to said mirror drum with the axis of said gate substantially in coincidence with said fixed axis, a projection lens positioned with its optical axis intersecting said fixed axis and also said mirrors as the mirror drum rotates, means including a bell crank connecting said film gate and said projection lens for maintaining a fixed distance between said gate and said lens, means comprising a cathode-ray tube to produce a scanning pattern fixed in space adjacent to said projection lens, means including said lens to produce an image of said pattern in said curved gate, means coupled to said rotatable drum to move a film past said gate at the same speed that said image moves past said gate, and means to convert the light passing through said film into electric signal current representative of the subject-matter of the frames of said motion picture film.

2. An optical device for exposing motion picture film comprising a member rotatable about an axis, a plurality of plane mirrors mounted on said member for oscillation about individual axes lying in the reflecting planes thereof parallel to the axis of said member at equal distances therefrom, said mirrors being uniformly spaced from one another, a projection lens positioned adjacent to said member with its axis intersecting said mirrors as said member rotates, means to oscillate said mirrors individually about their axes as the member rotates to maintain the intersection of each reflecting plane with the axis of said lens at a fixed point in the axis of said lens, means comprising a cathode-ray tube to produce a television image fixed in space adjacent to said projection lens, a movable film guide located at the conjugate reflected focal point of said projection lens with respect to the focal point corresponding to the position of said television image, means including a bell crank and a cam connecting said projection lens and said film guide for maintaining said relative location between said lens and said guide, and means to move said film past said guide at the same speed as the projected image of said television image moves past said guide.

3. An optical image producing device for continuously moving motion picture film comprising a support, a mirror drum rotatably mounted on said support and having an even number of generally cylindrical mirror bearing compartments parallel to, equally spaced from, and uniformly spaced around the axis of said drum, a mirror bearing compartment having a substantially cylindrical outer surface and a substantially coaxial rotatable member, a plurality of accurately positioned contact pads on the inner surfaces of said compartments against which said mirror bearings are tightly held, a plane mirror mounted at one end of each rotatable member with the reflecting plane coincident with the axis of said rotatable member, an adjustable cam follower secured to the other end of each rotatable member, said cam follower comprising a shaft connected to said rotatable member, a loosely rotatable cam lever mounted on said shaft, a cam roller attached to said cam lever, a driving member secured to said shaft in proximity to said cam lever, a spring connection between said driving member and said cam lever tending to rotate said cam lever and said driving member in opposite directions and an adjustable screw to limit the amount of relative motion of said driving member and said lever, a cam disc rigidly secured to said support substantially perpendicular to said mirror drum, and resilient means holding each cam roller in contact with the edge of said cam disc which is shaped to oscillate each mirror about its rotatable member and about an axis fixed in space during some portion of the rotation of the drum, said fixed axis lying in the path of the axes of said rotatable members.

References Cited in the file of this patent

UNITED STATES PATENTS

| | | |
|---|---|---|
| 1,224,304 | King | May 1, 1917 |
| 1,401,346 | Mechau | Dec. 27, 1921 |
| 1,421,523 | Mechau | July 4, 1922 |
| 1,541,218 | Higginson | June 9, 1925 |
| 1,549,750 | Dole | Aug. 18, 1925 |
| 1,613,730 | Steigman | Jan. 11, 1927 |
| 2,095,848 | Wittel | Oct. 12, 1937 |
| 2,099,987 | Murdock | Nov. 23, 1937 |
| 2,225,033 | Condliffe | Dec. 17, 1940 |
| 2,261,848 | Goldmark | Nov. 4, 1941 |
| 2,315,291 | Mattke | Mar. 30, 1943 |
| 2,622,147 | Condliffe et al. | Dec. 15, 1952 |

FOREIGN PATENTS

| | | |
|---|---|---|
| 293,630 | Great Britain | July 12, 1928 |
| 464,800 | France | Jan. 22, 1914 |
| 542,135 | France | May 12, 1922 |
| 589,740 | France | Feb. 27, 1925 |